(12) United States Patent
Ito

(10) Patent No.: US 11,153,516 B2
(45) Date of Patent: Oct. 19, 2021

(54) IMAGE CAPTURE APPARATUS AND CONTROL METHOD THEREFOR

(71) Applicant: CANON KABUSHIKI KAISHA, Tokyo (JP)

(72) Inventor: Shigeyoshi Ito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/866,687

(22) Filed: May 5, 2020

(65) Prior Publication Data

US 2020/0358953 A1 Nov. 12, 2020

(30) Foreign Application Priority Data

May 8, 2019 (JP) .............................. JP2019-088572

(51) Int. Cl.
*H04N 5/343* (2011.01)
*H04N 5/353* (2011.01)
*H04N 1/21* (2006.01)
*H04N 5/232* (2006.01)

(52) U.S. Cl.
CPC ............. *H04N 5/343* (2013.01); *H04N 1/212* (2013.01); *H04N 5/23245* (2013.01); *H04N 5/3532* (2013.01); *H04N 5/23293* (2013.01)

(58) Field of Classification Search
CPC ............... H04N 1/212; H04N 5/23245; H04N 5/23293; H04N 5/343; H04N 5/3532
See application file for complete search history.

(56) References Cited

U.S. PATENT DOCUMENTS

| 4,714,963 A | * | 12/1987 | Vogel | ................... H04N 5/2353 348/220.1 |
| 2009/0096916 A1 | * | 4/2009 | Kim | ................... H04N 5/23218 348/362 |
| 2015/0097999 A1 | * | 4/2015 | Sambonsugi | .......... H04N 5/372 348/322 |

FOREIGN PATENT DOCUMENTS

JP 2018-038088 A 3/2018

* cited by examiner

*Primary Examiner* — Daniel M Pasiewicz
(74) *Attorney, Agent, or Firm* — Cowan, Liebowitz & Latman, P.C.

(57) ABSTRACT

An image capture apparatus comprises an image sensor and a control circuit that controls operations of the image sensor. The control circuit, in a case where a still image shooting instruction is input during moving image shooting that uses the image sensor, performs a first shot of still image shooting using the image sensor upon a time determined in advance elapsing from input of the shooting instruction, and, in a case where the shooting instruction is continuously input, controls the image sensor to perform still image shooting of a second shot onward during a blanking time period of the moving image shooting.

10 Claims, 8 Drawing Sheets

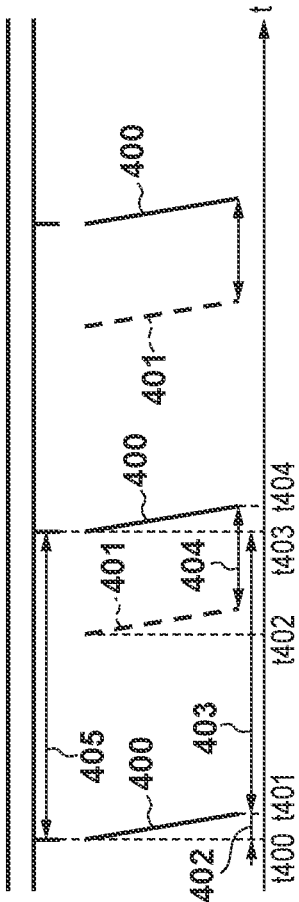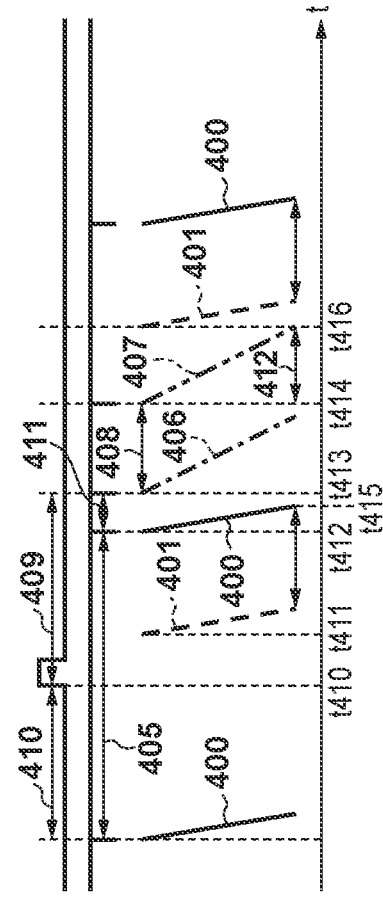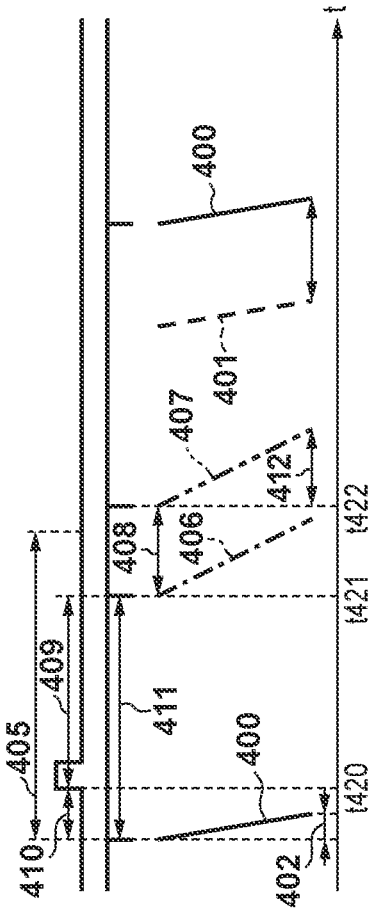

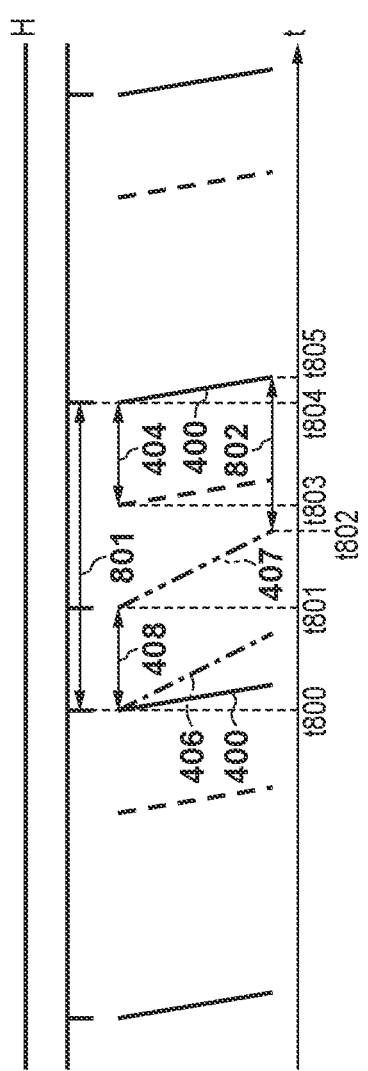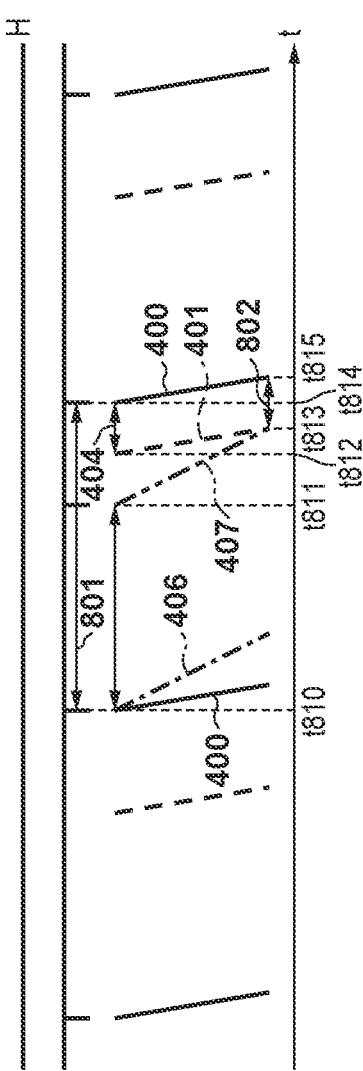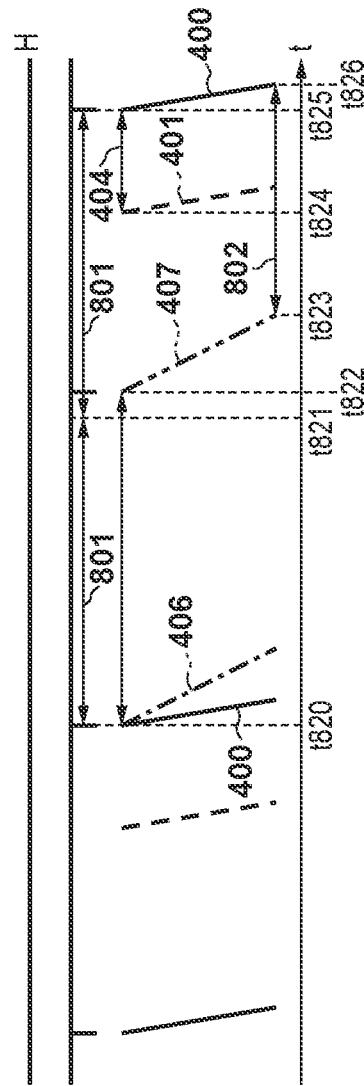

IMAGE CAPTURE APPARATUS AND CONTROL METHOD THEREFOR

BACKGROUND OF THE INVENTION

Field of the Invention

The present invention relates to an image capture apparatus and a control method therefor, and more particularly to an image capture apparatus capable of shooting still images during moving image shooting and a control method therefor.

Description of the Related Art

There are digital cameras and electronic devices provided with a camera function (hereinafter, referred to collectively as image capture apparatuses) that have a live view (LV) function. The LV function causes a display device that displays a moving image to function as a viewfinder, by executing moving image shooting in parallel with display of the moving image obtained by the moving image shooting. The user is able to adjust the shooting range of the moving image and still images to be recorded, using the moving image that is displayed by the LV function.

Generally, since resolution and the like differ between still image data and moving image data, the operations of the image sensor also differ between the time of still image shooting and the time of moving image shooting. In the case of using the same image sensor for moving image shooting and still image shooting, the operations of the image sensor need to be switched according to the type of picture being shot. Depending on the timing of still image shooting, moving image shooting may need to be suspended, in which case adverse effects occur, such as live view display being suspended and the update frequency of display images decreasing.

Japanese Patent Laid-Open No. 2018-038088 discloses a method for outputting the most recent full-resolution frame as a still image, in the case where still image shooting is instructed, while acquiring a moving image by reading out full-resolution frames and lower resolution frames from the image sensor in regular order.

As disclosed in Japanese Patent Laid-Open No. 2018-038088, adverse effects such as moving image shooting being suspended due to still image shooting and the update frequency of the moving image decreasing can be suppressed, by extracting one frame during moving image shooting as a still image. However, the still image intended by the user may not be obtained, depending on the difference between the timing at which a full-resolution frame was most recently shot and the input timing of a still image shooting instruction. Also, at the time of moving image shooting, two types of readout that differ in resolution need to be implemented while switching therebetween every frame. Thus, there is also a problem in that readout control of the image sensor and processing for generating display image data become complicated.

SUMMARY OF THE INVENTION

The present invention has been made in consideration of such problems with the conventional technologies, and, in one aspect thereof, provides an image capture apparatus capable of achieving both still image shooting at a timing in conformity with the intention of the user and stable moving image display at the time of still image shooting, and a control method therefor.

According to an aspect of the present invention, there is provided an image capture apparatus comprising: an image sensor; and a control circuit that controls operations of the image sensor, wherein the control circuit, in a case where a still image shooting instruction is input during moving image shooting that uses the image sensor, performs a first shot of still image shooting using the image sensor upon a time determined in advance elapsing from input of the shooting instruction, and, in a case where the shooting instruction is continuously input, controls the image sensor to perform still image shooting of a second shot onward during a blanking time period of the moving image shooting.

According to another aspect of the present invention, there is provided a control method for an image capture apparatus having an image sensor, the method comprising: executing, in a case where a still image shooting instruction is input during moving image shooting that uses the image sensor, a first shot of still image shooting using the image sensor upon a time determined in advance elapsing from input of the shooting instruction, and controlling, in a case where the shooting instruction is continuously input, the image sensor to perform still image shooting of a second shot onward during a blanking time period of the moving image shooting.

According to a further aspect of the present invention, there is provided a non-transitory machine-readable medium storing a program for causing a computer of an image capture apparatus that includes an image sensor to function as: a control unit that controls operations of the image sensor, wherein the control unit, in a case where a still image shooting instruction is input during moving image shooting that uses the image sensor, performs a first shot of still image shooting using the image sensor upon a time determined in advance elapsing from input of the shooting instruction, and, in a case where the shooting instruction is continuously input, controls the image sensor to perform still image shooting of a second shot onward during a blanking time period of the moving image shooting.

Further features of the present invention will become apparent from the following description of exemplary embodiments (with reference to the attached drawings).

BRIEF DESCRIPTION OF THE DRAWINGS

FIGS. 4A to 4C are timing charts relating to operations at the time of shooting still images during moving image shooting in the first embodiment.

FIGS. 8A to 8C are timing charts relating to operations at the time of shooting still images during moving image shooting in the second embodiment.

DESCRIPTION OF THE EMBODIMENTS

Figure 1:
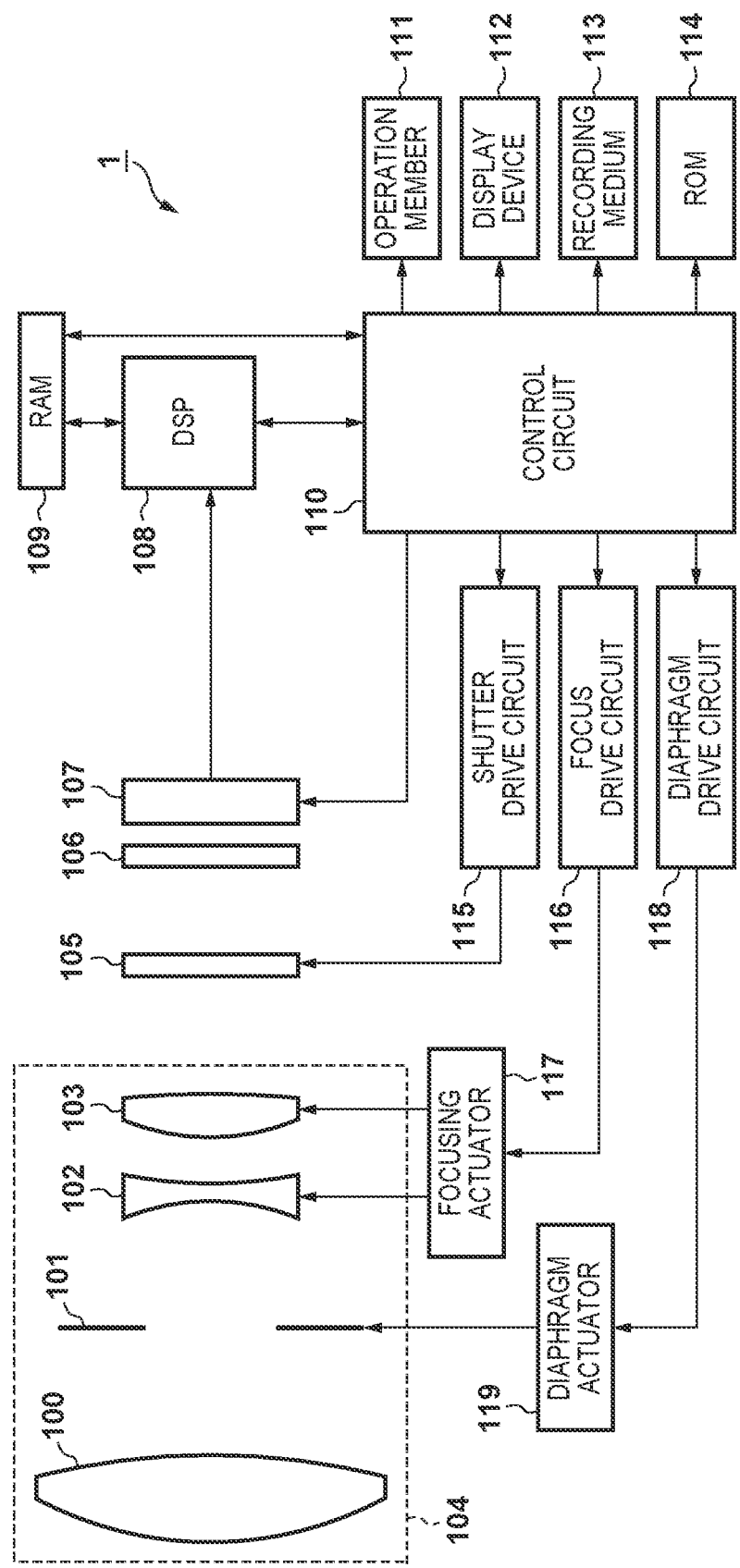
FIG. 1 is a block diagram showing an example functional configuration of an image capture apparatus according to an embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

The following embodiments describe examples in which the present invention is applied to an image capture apparatus such as a digital camera. However, the present invention is applicable to any electronic device having an image capture function capable of shooting still images during moving image shooting using a single image sensor. Such electronic devices include video cameras, computer devices (personal computers, tablet computers, media players, PDAs, etc.), mobile phones, smartphones, game machines, robots, drones, and drive recorders. These are illustrative examples, and the present invention is also applicable to other electronic devices.

First Embodiment

Configuration of Digital Camera

FIG. 1 is a block diagram showing an example functional configuration of a digital camera 1 serving as one example of an image capture apparatus according to a first embodiment of the present invention. A shooting optical system 104 forms an optical image of an object on an image capture surface of an image sensor 107. The shooting optical system 104 has a first lens 100, a diaphragm 101, a second lens 102, and a third lens 103. The first lens 100 is disposed at a leading end of the shooting optical system 104. The diaphragm 101 is driven by a diaphragm actuator 119, and has an adjustable aperture diameter. The second lens 102 and the third lens 103 constitute a focusing lens that adjusts the distance at which the shooting optical system 104 focuses. The second lens 102 and the third lens 103 are movable in a front-back direction along an optic axis, and are driven by a focusing actuator 117.

A focal-plane shutter 105 (hereinafter, shutter) is driven by a shutter drive circuit 115, and adjusts the exposure time of the image sensor 107 at the time of still image shooting. An optical low pass filter 106 reduces false color and moiré that appear in images obtained by the image sensor 107. The image sensor 107 is, for example, a CMOS image sensor in which a plurality of photoelectric conversion regions are two-dimensionally arranged. The image sensor 107 converts the optical image of the object that is formed by the shooting optical system 104 into electrical signals (analog image signals) with the plurality of photoelectric conversion regions.

A DSP (digital signal processor) 108 applies image processing determined in advance to image signals read out from the image sensor 107 and image data read out from a RAM 109, and generates still image data or moving image data for display or recording. Image processing that is applied by the DSP 108 includes preprocessing, color interpolation processing, correction processing, and data processing. Preprocessing includes A/D conversion, noise reduction, signal amplification, reference level adjustment, and defective pixel correction. Color interpolation processing is processing for interpolating the value of color components that are not included in image data read out from pixels, and is also referred to as demosaic processing. Correction processing includes white balance adjustment, processing for correcting the brightness of pictures, processing for correcting aberration in the optical system of the image capture lens 120, and processing for correcting color. Data processing includes scaling processing, encoding and decoding processing, and header information generation processing. Note that such image processing is illustrative of image processing that can be implemented by the DSP 108, and the present invention is not limited to image processing that is implemented by the DSP 108. The DSP 108 writes generated still image data to the RAM 109.

Note that the DSP 108 may apply detection processing and evaluation value calculation processing to generated image data. Detection processing involves detection of a feature region (e.g., face region, body region) and motion thereof, human recognition processing, and the like. Also, evaluation value calculation processing is processing for calculating evaluation values to be used by a control circuit 110, such as a pair of image signals for phase difference AF (auto focus detection), evaluation values for contrast AF, and evaluation values to be used in auto exposure control (AE).

The RAM 109 is used in order to store image data processed by the DSP 108 and programs that are performed by the control circuit 110 and to store information required in order for the control circuit 110 to perform the programs. Part of the RAM 109 may be used as a video memory for a display device 112. Note that any readable-writable storage device with sufficiently fast access speed can be used instead of or in addition to the RAM 109.

Also, in the present embodiment, a configuration is adopted in which the RAM 109 is disposed outside the DSP 108 and the control circuit 110. However, a configuration may be adopted in which at least part of the RAM 109 is built into the DSP 108 or the control circuit 110.

The control circuit 110 has a CPU, for example, and realizes the functions of the digital camera 1 including processing that will be discussed later, by loading and executing programs stored in a ROM 114 in the RAM 109. Note that a field-programmable gate array (FPGA) which is a programmable processor may be used instead of the CPU. The control circuit 110 sets operational modes of the image sensor 107, and generates various types of signals for controlling the timing of operations and supplies the generated signals to the image sensor 107. Also, the control circuit 110 performs AF processing for adjusting the focus position of the shooting optical system 104 and AE processing for adjusting the aperture diameter of the diaphragm 101, using the evaluation values calculated by the DSP 108.

An operation member 111 is a general term for a plurality of input devices provided in order for the user to give instructions to the digital camera 1. Typical input devices that are included in the operation member 111 include buttons, switches, levers, dials, a joy stick and a touchpad, and are not limited thereto. The operation member 111 also includes a configuration for realizing input that does not require a physical operation, such as eye-gaze input and voice input. The functions are statically or dynamically allocated to the individual input devices, and the function allocated to an input device is realized when that input device is operated. A release button, a menu button, arrow keys and the like are examples of the names of input devices to which functions are allocated.

In the present embodiment, the control circuit 110, upon detecting an instruction for shooting a still image (e.g., pressing of the release button) via the operation member 111, for example, starts an operation for shooting a still image after a given length of time (release time lag). Thereafter, if the still image shooting instruction is input continuously, the control circuit 110 performs the still image shooting operation every period or interval determined in advance (continuous shooting).

The display device 112 is a display device such as a liquid crystal display (LCD) or an organic light emitting diode (OLED) display, for example. The display device 112 displays moving image data and still image data for display that are generated by the DSP 108. The display device 112 which displays live view image data (moving image data) functions as an electronic viewfinder (EVF). The display device 112 also displays GUIs such as menu screens and images representing information of the digital camera 1 (e.g., images representing the values of shooting parameters that are currently set).

The recording medium 113 is, for example, a nonvolatile memory, and may be removable such as a memory card. Moving image data and still image data for recording that are generated by the DSP 108 are recorded on the recording medium 113 as data files having a predetermined format.

The ROM 114 stores programs that are executable by the CPU of the control circuit 110, various setting values and initial values, GUI data, and the like. The ROM 114 may be rewritable.

The shutter drive circuit 115 has a motor, a coil and the like that drive the shutter 105. The shutter drive circuit 115 controls the opening and closing operation of the shutter 105, under the control of the control circuit 110.

A focus drive circuit 116 has an actuator that drives the focusing lens (second lens 102, third lens 103) along the optic axis, a sensor that detects the position of the focusing lens, and the like. The focus drive circuit 116 controls the position of the focusing lens under the control of the control circuit 110, and adjusts the focus position of the shooting optical system 104.

A diaphragm drive circuit 118 controls the operations of an actuator 119 that drives the diaphragm 101, under the control of the control circuit 110, and adjusts the aperture size of the diaphragm 101.

Configuration of Image Sensor

Next, an example configuration of the image sensor 107 will be described, with reference to FIGS. 2A and 2B. In the present embodiment, the image sensor 107 performs charge accumulation and readout in units of lines. The image sensor 107 may be a CMOS image sensor, for example.

Figures 2A, 2B:
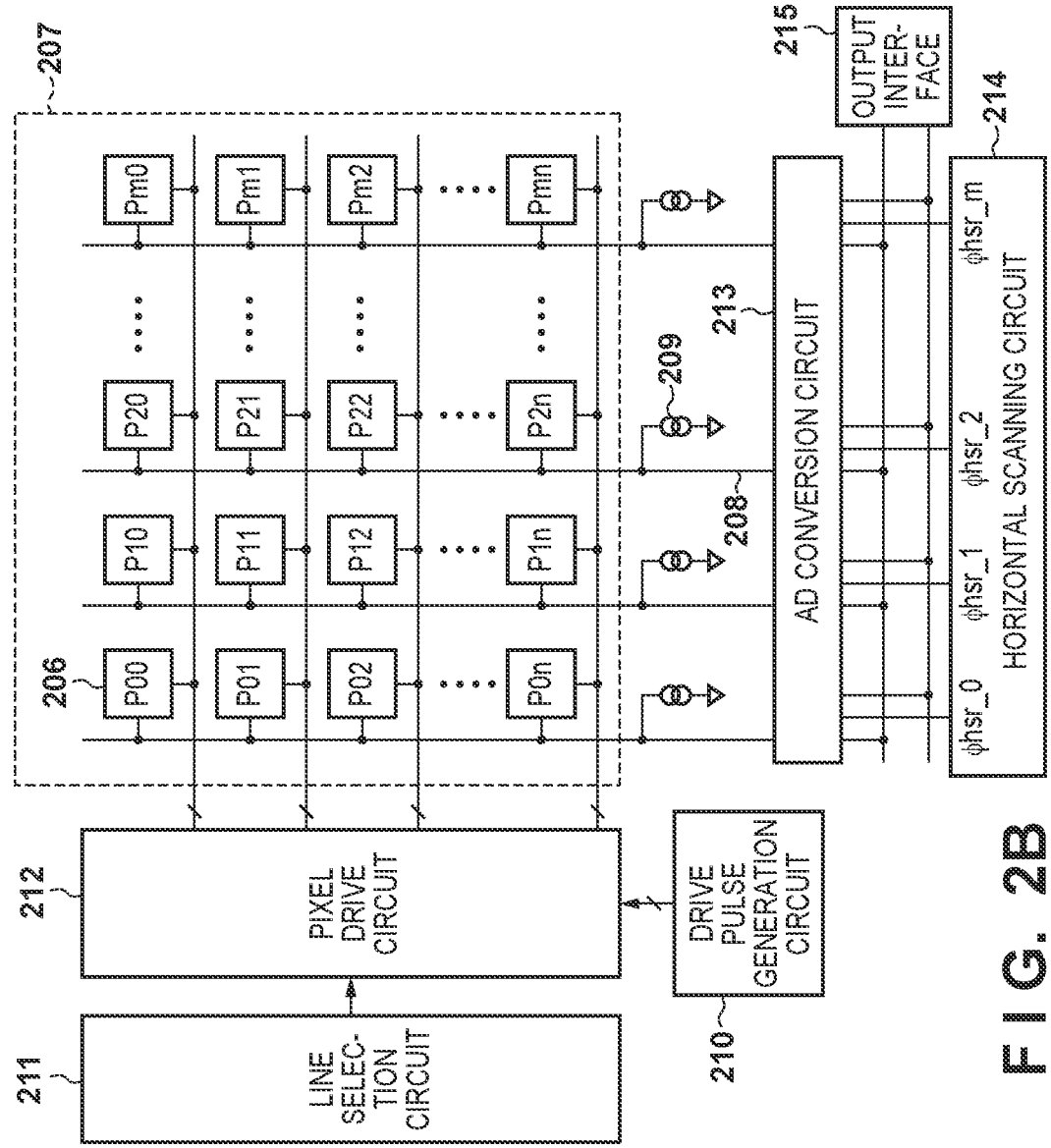
FIGS. 2A and 2B are diagrams showing an example configuration of an image sensor in an embodiment.

FIG. 2A is a diagram showing an example circuit configuration of a plurality of unit pixels 206 that are provided in the image sensor 107. The unit pixels have one micro lens and a photodiode (PD) 200 that functions as a photoelectric conversion unit. A plurality of the photodiodes 200 may be provided per unit pixel. A transfer switch 201 is turned on when the value of a signal φptx is high (H) level. When the transfer switch 201 is ON, the photoelectric charge accumulated in the PD 200 is transferred to a floating diffusion (FD) 202.

A reset switch 203 is turned on when a signal φpres is H level. The FD 202 is reset, by setting the signals φptx and φpres both to H level, and setting the PD 200 and the FD 202 to a power supply voltage (VDD).

An amplification transistor 204 is connected at one end to the power supply voltage VDD and at another end to a selection switch 205. The selection switch 205 is connected at one end to the amplification transistor 204 and at another end to a vertical signal line 208 (see FIG. 2B) external to the unit pixel 206. The selection switch 205 is turned on when the value of a signal φpsel is set to H level, and is connected to the amplification transistor 204 and the vertical signal line 208. The charge amount transferred to the FD 202 is thereby converted into a voltage value by the amplification transistor 204, and output to the vertical signal line 208 as a pixel signal.

FIG. 2B is a block diagram showing an example circuit configuration of the image sensor 107. In a pixel array 207, the plurality of unit pixels 206 are arranged in a matrix of (m+1) pixel units horizontally (left-right direction on the page) and (n+1) pixel units vertically (up-down direction on the page). Note that m and n are natural numbers.

A drive pulse generation circuit 210 generates a pulse for performing a reset operation or a readout operation of the unit pixels 206, under the control of the control circuit 110. The generated pulse is supplied to a pixel drive circuit 212. A line selection circuit 211 selects a pixel line and sets the selected line in the pixel drive circuit 212. The pixel drive circuit 212 supplies the pulse generated by the drive pulse generation circuit 210 to the pixel line set by the line selection circuit 211. Accordingly, the plurality of unit pixels 206 arranged on the same pixel line are driven by a common pulse.

The pixel signals of the unit pixels 206 are read out from the pixel drive circuit 212 to the vertical signal line 208 in units of pixel lines to which the selection pulse is supplied. A constant current source 209 forms a source follower circuit with the amplification transistor 204 within the unit pixels 206. An AD conversion circuit (ADC) 213 converts the pixel signal (analog voltage) read out to each of the vertical signal line 208 into a digital value that depends on the voltage value. The plurality of pixel signals converted into digital values by the ADC 213 are selected in order by a horizontal scanning circuit 214, and transferred to an output interface 215.

The pixel signals can be read out in different ways by changing the method of selecting the pixel lines by the line selection circuit 211. For example, in the present embodiment, in a still image mode, pixel signals are read out one line at a time from the uppermost line to the lowermost line of the pixel array 207. On the other hand, in a moving image mode, after reading out the uppermost line of the pixel array 207, two lines are skipped and the fourth line is read out, and, thereafter, the (3p−2)th line (where p is a natural number) is similarly read out until the lowermost line. In the moving image mode, the vertical resolution of pictures is lower than in the still image mode, but high-speed readout is possible. Note that the readout modes described here are merely illustrative examples, and other readout modes may be adopted. Also, the readout methods of the still image mode and the moving image mode may be other readout methods.

Circuits other than the line selection circuit 211 may also be configured to perform different operations depending on the readout mode that is set in the image sensor 107. Note that, in the present embodiment, the pixel drive circuit 212 and the ADC 213 are provided in the image sensor 107, but may be provided outside the image sensor 107.

Still Image Shooting Operation During Moving Image Shooting

Next, the still image shooting operation during moving image shooting in the digital camera 1 of the present embodiment will be described using the flowchart shown in FIG. 3. The control circuit 110 of the digital camera 1 performs the operations shown in the flowchart of FIG. 3 when the still image shooting instruction is detected during moving image shooting. The still image shooting instruction may be pressing of the release button included in the operation member 111.

Here, the moving image is, for example, a moving image shot for live view display. Also, the moving image is shot at an interval that depends on a frame rate determined in advance. Here, the shooting frame rate may be the same as or may differ from the display frame rate of the display device 112. The shooting frame rate of a moving image for recording is greater than or equal to the recording frame rate, for example. In the case where, for example, the display frame rate and the shooting frame rate are 60 fps, shooting of a moving image is performed at an interval of approximately 16.6 ms. If the frame rate is 120 fps, moving image shooting is performed at an interval of 8.3 ms.

Upon the still image shooting instruction being detected, the control circuit 110, in step S301, calculates the accumulation start timing and readout start timing of still image shooting. Here, the time difference (release time lag) from the still image shooting instruction until still image shooting is started is determined in advance. Also, the length of the accumulation time period at the time of still image shooting is an exposure time (shutter speed) determined in advance by the user setting or auto exposure control (AE) that is based on the brightness information on the shot moving image.

In step S302, the control circuit 110 determines whether there is a moving image readout time period that overlaps with the accumulation time period of still image shooting, based on the timing calculation results. In the present embodiment, the control circuit 110 determines NO when the following two conditions are met, and determines YES, if at least one of the conditions is not met.

Condition 1: The remainder of dividing the sum of time T1 from the timing of the vertical synchronization signal for moving image shooting output most recently until the timing at which the still image shooting instruction is detected and the release time lag T2 by the shooting interval the moving image is greater than the moving image readout time T3. That is, (T1+T2) mod moving image shooting interval>T3. Here, mod is a modulus operator, and a mod b is the remainder of dividing a by b.

Condition 2: The total of the remainder derived in condition 1, the still image accumulation time T4 and the still image readout time T5 is shorter than the moving image shooting interval. That is, ((T1+T2) mod moving image shooting interval)+T4+T5<moving image shooting interval. Note that the determination in step S302 may be performed with other methods.

The control circuit 110 advances the processing to step S303 if the determination in step S302 is YES, and decides not to perform readout of moving image frames whose readout time period overlaps with the still image accumulation time period. On the other hand, if the determination in step S302 is NO, the control circuit 110 advances the processing to step S304, and decides to perform moving image readout as scheduled.

Thereafter, in step S305, the control circuit 110 sets the still image mode as the readout mode of the image sensor 107. In step S306, the control circuit 110 waits for the release time lag to elapse.

When the release time lag has elapsed, the control circuit 110, in step S307, performs the still image shooting operation. Specifically, the control circuit 110 exposes the image sensor 107, and instructs the image sensor 107 to start still image readout. The image sensor 107 starts still image readout processing in response to the instruction from the control circuit 110. Note that in the case where at least part of the time period related to still image shooting and readout overlaps with the moving image shooting time period, exposure for moving image shooting is temporarily stopped due to the still image shooting, and the control circuit 110 continues moving image display by repeatedly displaying the immediately previous moving image frame, for example.

In step S308, the control circuit 110 resumes exposure for moving image shooting, after setting the image sensor 107 to the moving image mode. Here, moving image shooting is continuously performed for a predetermined number of frames that is based on a predetermined shooting period at the time of continuous still image shooting. Thereafter, in step S309, the control circuit 110 determines whether the still image shooting instruction is being continuously input. The control circuit 110, if it is determined that the still image shooting instruction is being continuously input, advances the processing to step S310, and, if it is not determined that still image shooting instruction is being continuously input, ends the processing after having determined that still image shooting has ended, and returns to normal moving image shooting.

In step S310, the control circuit 110 sets the image sensor 107 to the still image mode similarly to step S305.

Thereafter, in step S311, the control circuit 110 performs still image shooting in the time period (blanking time period) from when moving image shooting and readout of a given frame ends until when the next frame moving image shooting is started, and returns the processing to step S308.

Figure 3:
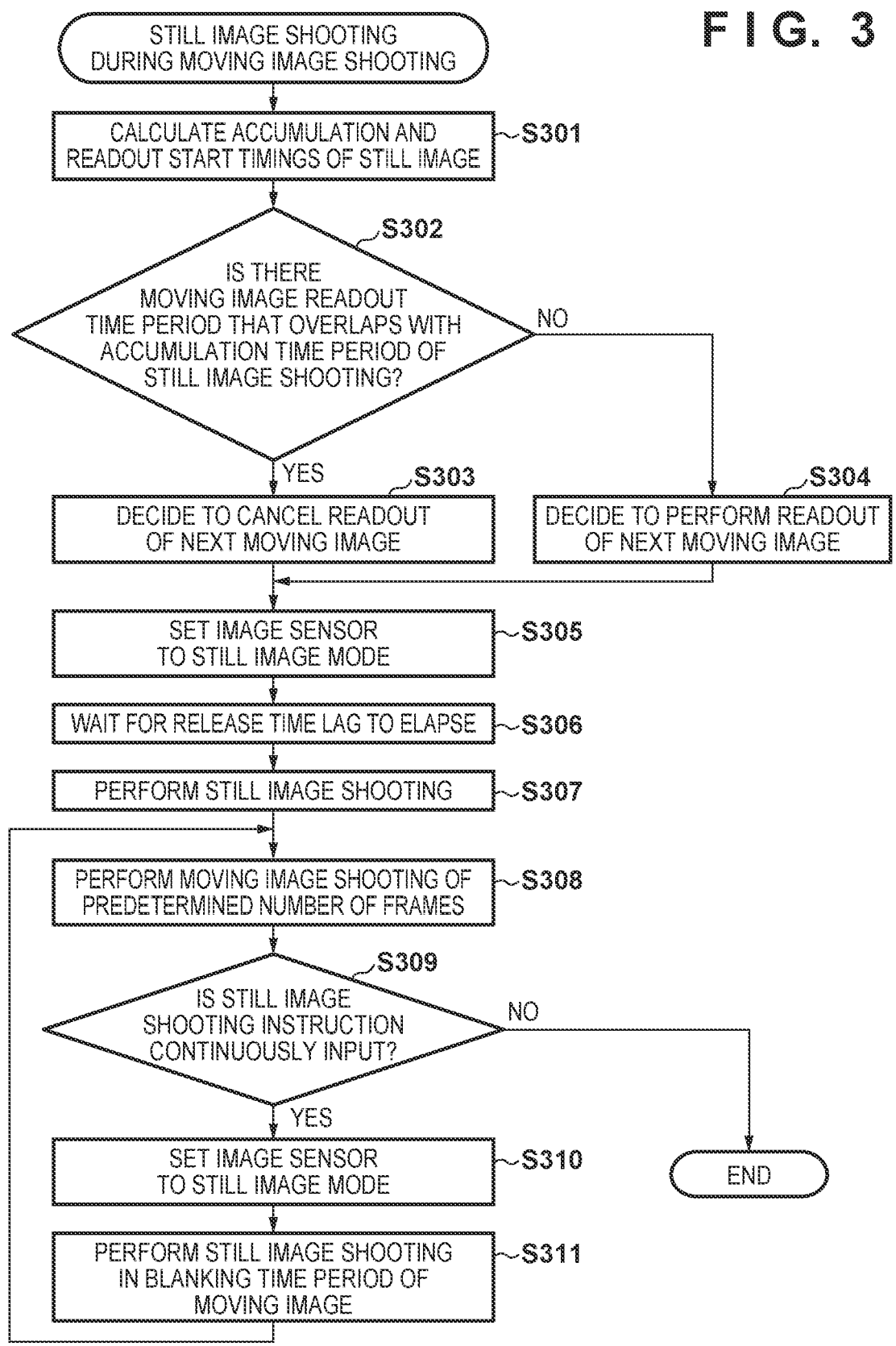
FIG. 3 is a flowchart relating to operations at the time of shooting still images during moving image shooting in a first embodiment.

The operations described using FIG. 3 will be further described using the timing charts shown in FIGS. 4A to 4C.

FIG. 4A shows an example of the timing of moving image shooting in a state where the still image shooting instruction is not input. Moving image shooting is performed whenever the vertical synchronization signal is input.

Upon the vertical synchronization signal being input at t400, the image sensor 107 starts a readout scan 400 (solid line) in the moving image mode. Upon readout scan 400 being completed at t401, the image sensor 107 thereafter starts a moving image reset scan 401 (dashed line) from t402. Then, upon the following vertical synchronization signal being input at t403, the moving image readout 400 of the following frame is started.

From the readout start time t400 to the readout completion time t401 is a moving image readout time period 402. Also, from the readout completion time t401 to the next readout start time t403 is a moving image blanking time period 403. Also, the time difference from t402 to t403 is a moving image accumulation time 404. Also, from t401 to t403 is a moving image frame interval 405. Note that the time period from the start of moving image accumulation to the end of readout (from t402 to t404) is also referred to as a moving image drive time period.

FIG. 4B shows operations in the case where the still image shooting instruction is input at t410. Upon the still image shooting instruction being input at t410, the control circuit 110 performs the operations shown in FIG. 3. In the example in FIG. 4B, 410 corresponding to time T1 from the timing of the vertical synchronization signal for moving image shooting output most recently until the timing at which the still image shooting instruction is detected. Also, 409 corresponds to a release time lag T2. Accordingly, the remainder in condition 1 is the length of time shown by 411. The moving image readout time T3 corresponds to the difference between t412 and t415, and thus the remainder 411 is greater than the moving image readout time T3, and meets condition 1.

Next, the total of the remainder 411, an accumulation time period 408 of still image shooting and a still image readout time period 412 corresponds to the time from t412 to t416, and is shorter than the moving image frame interval 405. Accordingly, condition 2 is also met.

Accordingly, the control circuit 110 determines that, with regard to the example shown in FIG. 4B, there is not a moving image readout time period that overlaps with the accumulation time period 408 of still image shooting (determination in step S302: NO). The control circuit 110 then decides to read out the next moving image frame in step S304. Accordingly, the image sensor 107 performs the moving image reset scan 401 from t411, and performs the readout scan 400 of the next moving image frame upon the vertical synchronization signal being input at t412.

Upon readout of the moving image frame being completed, the control circuit 110 sets the image sensor 107 to the still image mode (step S308). Upon the release time lag elapsing from time t410, the vertical synchronization signal is input to the image sensor 107 at t413, and the image sensor 107 performs processing for still image shooting. Specifically, a still image reset scan 406 (one-dot chain line) is performed first. After exposure by the shutter 105 is performed, the image sensor 107 performs a still image readout scan 407 (two-dot chain line) from t414. The time from time t413 at which the still image reset scan 406 is started until time t414 at which the still image readout scan 407 is started corresponds to the accumulation time period 408 of still image shooting. Note that the time period from the start of still image accumulation to the end of readout (from t413 to t416) is also referred to as a still image drive time period.

In this way, if the time period related to still image shooting and readout that started after the release time lag elapses does not overlap with the moving image shooting time period, in the case where the still image shooting instruction is input during moving image shooting, still image shooting is implemented in the blanking time period of moving image shooting, and does not affect moving image shooting.

FIG. 4C shows operations in the case where the still image shooting instruction is input at a timing t420 that is different from FIG. 4B. In this case, since the total of 410 and 409 is shorter than the moving image frame interval 405, the remainder 411 will be the total of 410 and 409. Accordingly, the remainder 411 is larger than the moving image readout time period 402, and meets condition 1.

On the other hand, the total of the remainder 411, the accumulation time period 408 of still image shooting and the still image readout time period 412 is longer than the moving image frame interval 405. Accordingly, condition 2 is not met. Accordingly, the control circuit 110 determines that there is a moving image readout time period that overlaps with the accumulation time period 408 of still image shooting relating to the example shown in FIG. 4C (determination in step S302: YES). The control circuit 110, in step S303, then decides not to perform (to cancel) readout of the next moving image frame. Moving image shooting that started from t411 in the example in FIG. 4B is thereby not performed in the example in FIG. 4C.

The control circuit 110 sets the image sensor 107 to the still image mode (step S308). Upon the release time lag elapsing from time t420, the vertical synchronization signal is input to the image sensor 107 at t421, and the image sensor 107 performs processing for still image shooting. Note that the release time lag 409 is constant due to not being dependent on the determination result of step S302. The time from when the user pushes the release button until when the first still image is shot can thereby be kept constant.

Next, operations in case where still images are continuous shot will be described using the timing charts shown in FIGS. 5A and 5B.

Figure 5A:
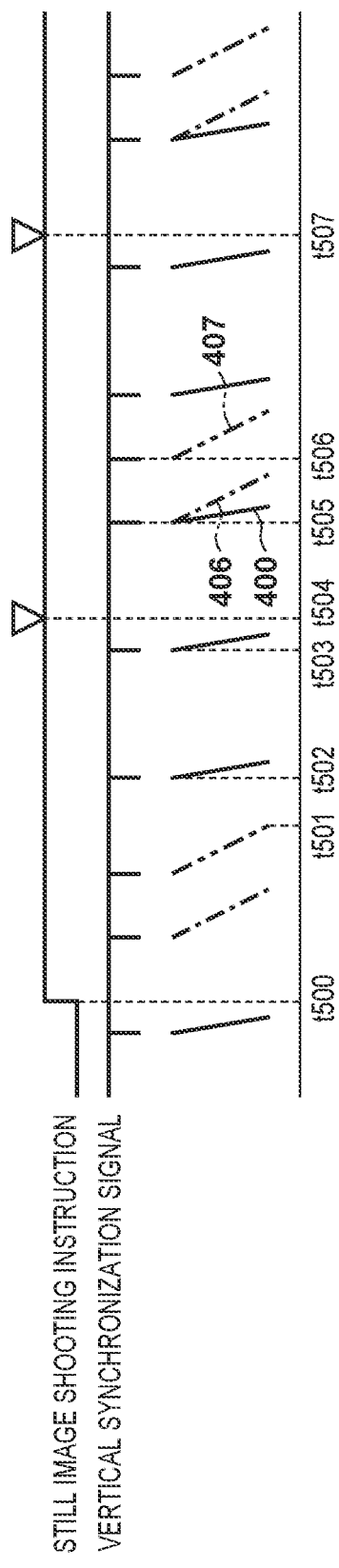
FIGS. 5A and 5B are timing charts relating to operations at the time of shooting still images during moving image shooting in the first embodiment.

FIG. 5A shows operations from when the still image shooting instruction was first input until when continuous shooting is continuously performed. The operations shown in FIG. 4B or FIG. 4C are performed from when the still image shooting instruction is input at t500 until t501 when the first shot of still image shooting is completed. Thereafter, moving image shooting of a predetermined number of frames is performed (step S308). The number of frames to be shot here may be set by the user via the operation member 111, and may change according to the operation state of the camera. In the present embodiment, the predetermined number of frames is 2. In the example in FIG. 5A, moving image shooting (accumulation and readout) is performed from t502 and t503.

At t504, the control circuit 110 checks whether the still image shooting instruction is being continuously input (step S309). Here, since the still image shooting instruction is being continuously input, the processing from step S310 onward in FIG. 3 is performed. The control circuit 110 sets the still image reset scan 406 immediately after t504. The control circuit 110 then controls the operations of the image sensor 107 to start the still image reset scan 406 after starting the moving image readout scan 400 at t505. In the diagram, the still image reset scan 406 appears to start at the same time as the moving image readout scan 400, but the still image reset scan 406 is, in actual fact, started at a slight delay after the moving image readout scan 400. Also, the control circuit 110 sets the still image readout scan 407 during the still image reset scan 406. At t506, the image sensor 107 starts the still image readout scan 407. As a result, still image shooting in the blanking time period of moving image shooting (step S311) is performed. In the case where the still image shooting is continuous shooting, the start timing of still image shooting is decided such that still image shooting of the second shot onward is performed during the blanking time period of moving image shooting. Moving image shooting is thereby stably performed, and the update frequency of live view display is maintained, for example.

Thereafter, after again executing moving image shooting of a predetermined number of frames, the control circuit 110 again determines at t507 whether input of the still image shooting instruction is continuing. In the example in FIG. 5A, input is still continuing, and thus the control circuit 110 performs similar operations to the operations from t504 to t507.

Figure 5B:
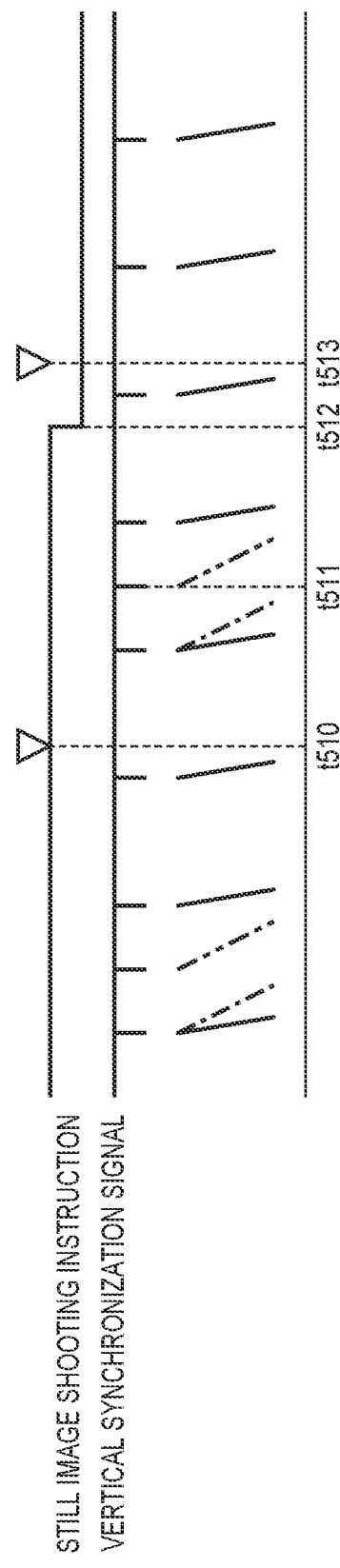

FIG. 5B shows operations at the time that continuous still image shooting ends. The still image shooting instruction that was first input at t500 of FIG. 5A is still continuing at t510. Therefore, from t510 to t513, similar operations to the operations from t504 to t507 are performed. Upon the still image shooting instruction no longer being input at t512 and this being detected at t513, the control circuit 110 ends processing for still image shooting (step S309, NO). Thereafter, the control circuit 110 continuously performs moving image shooting.

As described above, according to the present embodiment, in the case of shooting still images during shooting of a moving image such as a live view image, a given release time lag can be set with regard to the still image shooting being single shooting or the first shot of continuous shooting. Thus, still image shooting at the timing intended by the user will be possible. On the other hand, in the case where the still image shooting is continuous shooting, the still image shooting is performed in the blanking time period of the moving image from the second shot onward. Thus, stable moving image display even during still image shooting becomes possible, without display of the moving image being suspended or the update frequency of the moving image decreasing. Moving image shooting can be prevented from constantly being stopped due to still image shooting, even in the case where the moving image shooting period and the continuous still image shooting period are in a multiplicative relationship, due to shifting the shooting timing of the second shot onward of continuous shooting, for example.

The present invention is not limited to the abovementioned configuration, and various modifications and changes can be made within the scope of the gist of the invention. For example, the flowchart of FIG. 3 can be changed to the flowchart of FIG. 6. Note that the same reference signs are given to steps for carrying out the same operations as FIG. 3 in FIG. 6, and redundant description is omitted.

Figure 6:
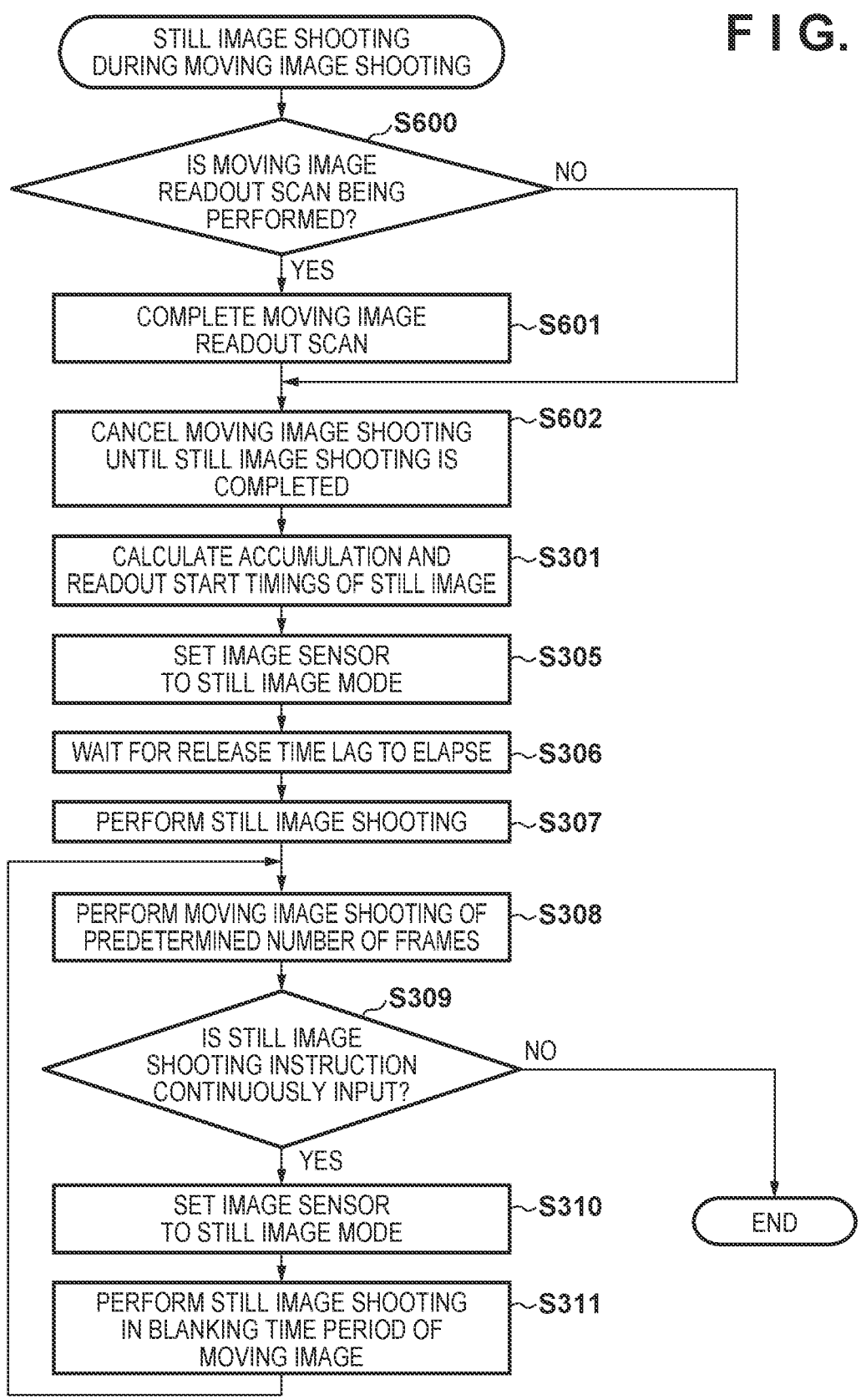
FIG. 6 is a flowchart relating to a variation of the first embodiment.

In the flowchart of FIG. 6, upon the still image shooting instruction being input, the control circuit 110, in step S600, determines whether the moving image readout scan 400 is being performed at that point in time, and advances the processing to step S601 if it is determined that the readout scan is being performed, and to step S602 if it is not determined that the readout scan is being performed. In step S601, the control circuit 110 waits until the readout scan being performed is completed, and advances the processing to step S602.

In step S602, the control circuit 110 controls the operations of the image sensor 107 so as to suspend moving image shooting until still image shooting is completed. Subsequently, the processing of step S301 and from step S305 onward is performed similarly to FIG. 3. In the operations shown in FIG. 3, a calculation needs to be performed in the processing of steps S302 to S304 for deciding whether to read out the next moving image frame. Thus, in the case of needing to perform the determination in a short time, the control circuit 110 will require a high processing capacity.

In contrast, in the operations shown in FIG. 6, it can be easily determined whether to read out the next moving image frame, even though the number of moving image frames shot could possibly decrease. Thus, there is an advantage in that, even in the case where the processing capacity of the control circuit 110 is not high, it can be determined in a short time whether to read out the next moving image frame.

Second Embodiment

Next, a second embodiment of the present invention will be described. In the first embodiment, the timing of shooting is controlled by focusing mainly on the time period of the readout scan. However, an appropriate reset scan is required in order to perform appropriate shooting. In view of this, the present embodiment describes a method for setting the accumulation time of a moving image and a still image.

Figure 7:
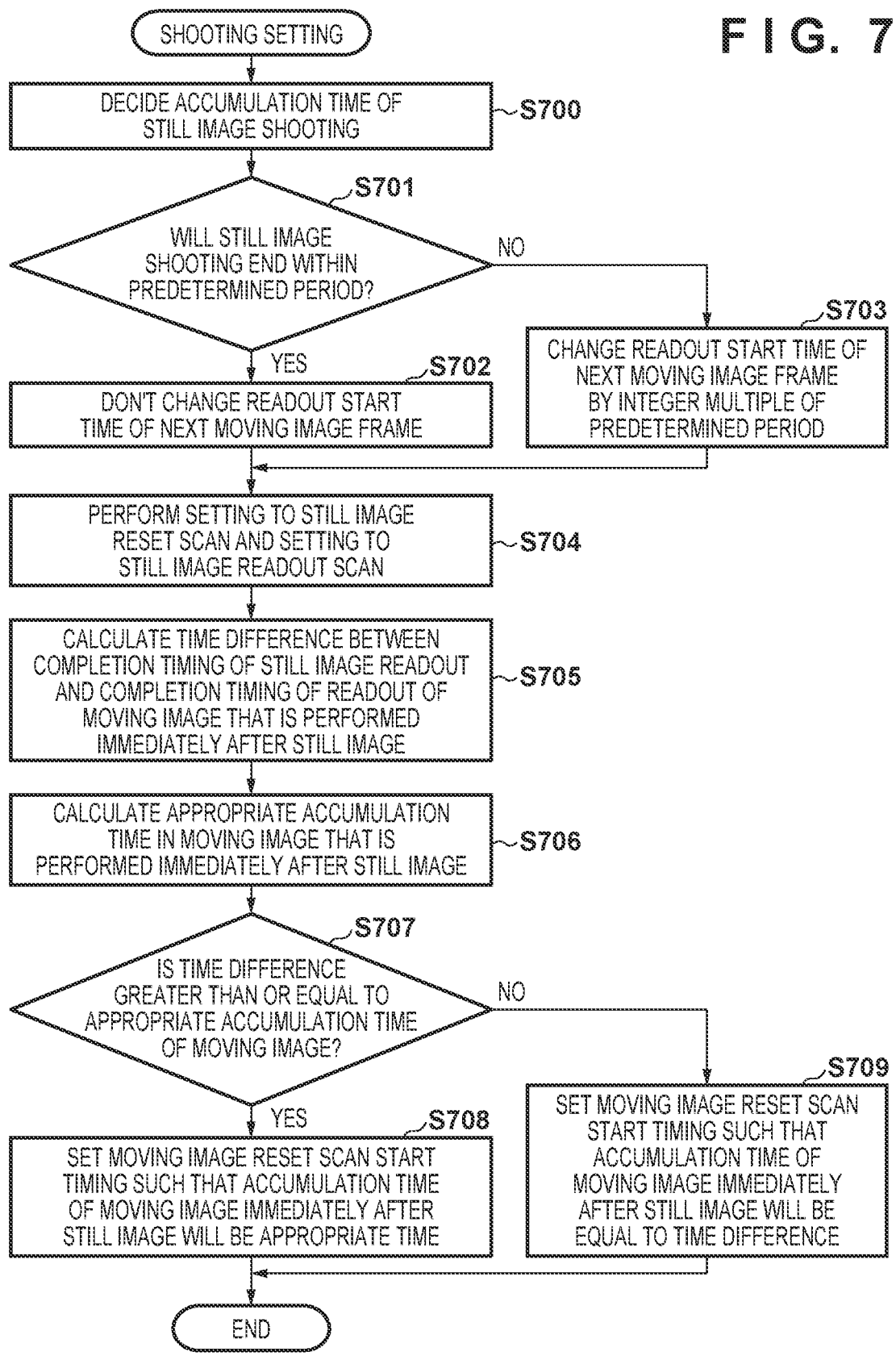
FIG. 7 is a flowchart relating to a second embodiment.

FIG. 7 is a flowchart relating to operations in which the control circuit 110 performs, with respect to the image sensor 107, setting relating to the still image reset scan 406, setting relating to the still image readout scan 407, and setting relating to the moving image reset scan 401 immediately after the still image. These operations can be implemented in step S305 of FIG. 3, for example.

In step S700, the control circuit 110 decides the accumulation time (exposure time) at the time of still image shooting based on user settings, auto exposure controls, and the like. And in step S701, the control circuit 110 determines whether the still image shooting time period will end within a predetermined period, in the case where still image shooting is performed for the decided accumulation time. This predetermined period may be the moving image shooting time period, for example. Alternatively, it may be determined whether the still image exposure time ends within a predetermined time. In this case, the predetermined time may be a time obtained by subtracting the still image readout time from the moving image shooting period, for example. In any case, the frame rate of moving image shooting cannot be sustained when the still image shooting time period/ exposure time exceed the predetermined period/predetermined time.

The control circuit 110 advances the processing to step S703, if it is determined that still image shooting will not end within the predetermined time in step S701. In step S703, the control circuit 110 changes (delays) the readout start time of the next moving image frame by an integer multiple of the predetermined period, and advances the processing to step S704. Here, the predetermined period is the moving image shooting period, for example. In step S703, the control circuit 110 changes the moving image shooting start time, such that still image shooting can be completed within the moving image blanking time period 403. On the other hand, if it is determined that still image shooting will end within predetermined time in step S701, the control circuit 110 advances the processing to step S702. In step S702, the control circuit 110 advances the processing to step S704, without changing the readout start time of the next moving image frame.

In step S704, the control circuit 110 performs setting relating to the still image reset scan 406 and setting relating to the still image readout scan 407 with respect to the image sensor 107. At this point in time, the control circuit 110 is able to ascertain the completion time of the still image readout scan 407. In view of this, the control circuit 110, in step S705, calculates the time difference between the completion time of the still image readout scan 407 and the completion time of the moving image readout scan 400 of moving image shooting that is performed immediately after the still image shooting. Also, in step S706, the control circuit 110 decides an appropriate accumulation time in the moving image shooting that is performed immediately after the still image shooting, based on various shooting conditions. The accumulation time can be decided using ISO sensitivity, the aperture size of the diaphragm 101, and the brightness of the object calculated from the image of the previous frame, for example.

In step S707, the control circuit 110 compares the time difference calculated in step S705 with the accumulation time decided in step S706. The control circuit 110 advances the processing to step S708 if the time difference is greater than or equal to the accumulation time, and to step S709 if the time difference is less than the accumulation time.

In step S708, the control circuit 110 performs setting (e.g., start time setting) relating to the moving image reset scan 401 such that the accumulation time of moving image shooting that is performed immediately after the still image shooting will be the accumulation time decided in step S706.

In step S709, the control circuit 110 performs setting (e.g., start time setting) relating to the moving image reset scan 401 such that the accumulation time of the moving image shooting that is performed immediately after the still image shooting will be equal to the time difference calculated in step S705.

The shooting setting is ended upon setting relating to the moving image reset scan 401 ending.

Control of the reset scan and the readout scan in the present embodiment will be described, using the timing charts of FIGS. 8A to 8C.

The timing chart in FIG. 8A shows operations in case where it is determined that still image shooting will end within the predetermined period in step S701 of FIG. 7, and it is determined in step S707 that the time difference is greater than or equal to the moving image accumulation time.

The image sensor 107 immediately starts the still image reset scan 406 upon starting the moving image readout scan 400 at t800. Upon the exposure time in still image shooting elapsing, the image sensor 107 starts the still image readout scan 407 at t801, and the still image readout scan 407 is completed at t802. From when the still image reset scan 406 is started until when the still image readout scan is completed is the still image shooting time period. Since the still image shooting time period is shorter than a predetermined period 801 (here, moving image shooting period), the control circuit 110 determines YES in step S701, and does not change a start time t804 of the moving image readout scan 400 of the next frame.

At the point in time that it is determined not to change the start time of the moving image readout scan 400, it is possible to calculate a time difference 802 between the completion time t802 of the still image readout scan 407 and the completion time t805 of the moving image readout scan 400. At this point in time, the appropriate accumulation time in moving image shooting is also determined. Here, the appropriate moving image accumulation time is shorter than the time difference 802 (step S707, YES). Thus, the control circuit 110 sets the start time t803 of the moving image reset scan 401, such that the moving image accumulation time 404 of the next frame will be equal to the appropriate moving image accumulation time (step S708).

The timing chart in FIG. 8B shows operations in the case where it is determined in step S701 of FIG. 7 that still image shooting will end within the predetermined period, and it is not determined in step S707 that the time difference is greater than or equal to the moving image accumulation time.

The image sensor 107 immediately starts the still image reset scan 406, upon starting the moving image readout scan 400 at t810. Upon the exposure time in still image shooting elapsing, the image sensor 107 starts the still image readout scan 407 at t811, and the still image readout scan 407 is completed at t813. Since the still image shooting time period is shorter than the predetermined period 801 (here, moving image shooting period), the control circuit 110 determines YES in step S701, and does not change the start time t814 of the moving image readout scan 400 of the next frame.

At the point in time at which it is determined not to change the start time of the moving image readout scan 400, it is possible to calculate the time difference 802 between the completion time t813 of the still image readout scan 407 and the completion time t815 of the moving image readout scan 400. At this point in time, the appropriate accumulation time in moving image shooting is also determined. Here, the appropriate moving image accumulation time is longer than the time difference 802 (step S707, NO). Thus, the control circuit 110 sets the start time t812 of the moving image reset scan 401, such that the moving image accumulation time 404 of the next frame will be equal to the time difference 802 (step S708).

In the example in FIG. 8B, the moving image accumulation time 404 cannot be set to an appropriate exposure time. Accordingly, the frame obtained in the moving image shooting that is performed following the still image shooting will be underexposed. In this way, with regard to moving image shooting in which an appropriate accumulation time cannot be secured due to a long exposure time of the still image shooting, the control circuit 110 is able to control the DSP 108, for example, to compensate for the underexposure by applying a gain to the obtained moving image frame and amplifying the pixel values. The amount of gain can be derived from the difference between the appropriate accumulation time and the time difference 802.

The timing chart in FIG. 8C shows operations in the case where it is not determined that the still image shooting will end within in the predetermined period in step S701 of FIG. 7, and it is determined that the time difference is greater than or equal to the moving image accumulation time in step S707.

The image sensor 107 immediately starts the still image reset scan 406, upon starting the moving image readout scan 400 at t820. Upon the exposure time in still image shooting elapsing, the image sensor 107 starts the still image readout scan 407 at t822, and the still image readout scan 407 is completed at t823. Since the still image shooting time period is longer than the predetermined period 801 (here, moving image shooting period), the control circuit 110 determines NO in step S701, and changes the start time of the moving image readout scan 400 of the next frame. Specifically, the control circuit 110 changes the start time of the moving image readout scan 400 of the next frame that was originally to start at time t821 after the predetermined period 801 has elapsed from t820 to t825 at which a time twice as long as the predetermined period 801 has elapsed from t820.

At the point in time at which the changed start time of the moving image readout scan 400 is determined, it is possible to calculate the time difference 802 between the completion time t823 of the still image readout scan 407 and the completion time t826 of the moving image readout scan 400. At this point in time, the appropriate accumulation time in moving image shooting is also determined. Here, the appropriate moving image accumulation time is shorter than the time difference 802 (step S707, YES). Thus, the control circuit 110 sets the start time t824 of the moving image reset scan 401, such that the moving image accumulation time 404 of the next frame will be equal to the appropriate moving image accumulation time (step S708).

As described above, according to the present embodiment, the start timing of the reset scan is set such that the accumulation time at the time of moving image shooting will be an appropriate time, thus enabling moving image shooting to be performed at the correct exposure. Furthermore, in the case where the exposure time of still image shooting is long, and the accumulation time of moving image shooting is shorter than the appropriate accumulation time, exposure is corrected by applying a gain after moving image shooting. Thus, exposure variation can be suppressed, while moving image shooting is being performed as much as possible. Also, still images can be shot with a longer exposure time than the blanking time period of the moving image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-88572, filed on May 8, 2019, which is hereby incorporated by reference herein in its entirety.

What is claimed is:

1. An image capture apparatus comprising:
an image sensor; and
a control circuit that controls operations of the image sensor,
wherein the control circuit, in a case where a still image shooting instruction is input during moving image shooting that uses the image sensor, performs a first shot of still image shooting using the image sensor upon a time determined in advance elapsing from input of the shooting instruction, and, in a case where the shooting instruction is continuously input, controls the image sensor to perform still image shooting of a second shot onward during a blanking time period of the moving image shooting.

2. The image capture apparatus according to claim 1, wherein the control circuit, in a case where a time period of the first shot of still image shooting overlaps with a time period of the moving image shooting, controls the image sensor to not perform the overlapping moving image shooting.

3. The image capture apparatus according to claim 1, wherein the control circuit, in a case where the shooting instruction is input, controls the image sensor to suspend the moving image shooting until the first shot of still image shooting is completed.

4. The image capture apparatus according to claim 1, wherein the control circuit, in a case where the first shot of still image shooting will not end within a period determined in advance, delays a start time of a next moving image shooting by an integer multiple of the period determined in advance.

5. The image capture apparatus according to claim 1, wherein the control circuit, with regard to moving image shooting for which an appropriate accumulation time cannot be secured due to a long exposure time of the still image shooting, controls an image processing circuit to correct a brightness of an obtained moving image frame.

6. The image capture apparatus according to claim 5, wherein the control circuit, in a case where a time difference between a timing of still image readout completion and a timing of readout completion of a next moving image shooting is greater than or equal to the appropriate accumulation time, sets a start timing of a reset scan of the next moving image shooting in the image capture apparatus, such that an accumulation time of the next moving image shooting is the appropriate accumulation time.

7. The image capture apparatus according to claim 5, wherein the control circuit, in a case where a time difference between a timing of still image readout completion and a timing of readout completion of a next moving image shooting is not greater than or equal to the appropriate accumulation time, sets a start timing of a reset scan of the next moving image shooting in the image capture apparatus, such that an accumulation time of the next moving image shooting will be equal to the time difference.

8. The image capture apparatus according to claim 1, wherein a still image readout time is longer than a moving image readout time.

9. A control method for an image capture apparatus having an image sensor, the method comprising:
executing, in a case where a still image shooting instruction is input during moving image shooting that uses the image sensor, a first shot of still image shooting using the image sensor upon a time determined in advance elapsing from input of the shooting instruction, and controlling, in a case where the shooting instruction is continuously input, the image sensor to perform still image shooting of a second shot onward during a blanking time period of the moving image shooting.

10. A non-transitory machine-readable medium storing a program for causing a computer of an image capture apparatus that includes an image sensor to function as:
a control unit that controls operations of the image sensor,
wherein the control unit, in a case where a still image shooting instruction is input during moving image shooting that uses the image sensor, performs a first shot of still image shooting using the image sensor upon a time determined in advance elapsing from input of the shooting instruction, and, in a case where the shooting instruction is continuously input, controls the image sensor to perform still image shooting of a second shot onward during a blanking time period of the moving image shooting.

* * * * *